United States Patent [19]

Cheng

[11] 4,116,785

[45] Sep. 26, 1978

[54] PHOSPHONITRILIC POLYMERS WITH CURABILITY BY SULFUR ACCELERATED CURES OR RADIATION CURES

[75] Inventor: Tai Chun Cheng, Akron, Ohio

[73] Assignee: The Firestone Tire & Rubber Company, Akron, Ohio

[21] Appl. No.: 662,074

[22] Filed: Feb. 27, 1976

[51] Int. Cl.$^2$ .............................. C08F 8/00; C08F 8/18
[52] U.S. Cl. ........................... 204/159.14; 204/159.11; 204/159.18; 528/168; 528/399
[58] Field of Search .............. 260/2 P, 79.5 R, 79.5 P; 204/159.11, 159.14, 159.18; 526/4

[56] References Cited

U.S. PATENT DOCUMENTS

| 3,474,052 | 10/1969 | Halasa et al. | 260/2 P X |
|---|---|---|---|
| 3,676,311 | 7/1972 | Frank et al. | 204/159.14 |
| 3,896,058 | 7/1975 | Reynard et al. | 260/2 P |
| 3,970,533 | 7/1976 | Kyker et al. | 204/159.14 |
| 3,972,841 | 8/1976 | Cheng et al. | 260/2 P |

Primary Examiner—Richard B. Turer

[57] ABSTRACT

Improvements in phosphonitrilic polymers and compositions based on the same, possessing outstanding low temperature flexibility and good physical strength over a broad range of service conditions, are obtained by the incorporation of some unsaturated substituents in the side chains on the —P=N— backbone, to adapt the polymers to vulcanization with sulfur accelerated cure systems or radiation cure.

13 Claims, No Drawings

PHOSPHONITRILIC POLYMERS WITH CURABILITY BY SULFUR ACCELERATED CURES OR RADIATION CURES

This invention relates to polyphosphazenes which are possessed of an exceptional ease of curability and to useful articles produced from said polyphosphazenes. More particularly, it is directed to non-fluorinated polyphosphazenes similar to the polyphosphazenes described in U.S. Pat. No. 3,370,020 issued Feb. 20, 1968 and to improvements thereon such as those described in U.S. Pat. Nos. 3,853,794 issued Dec. 10, 1974; 3,856,712 and 3,856,713 issued Dec. 24, 1974; the disclosures of which are intended to be incorporated herein by this reference.

One object of this invention is to provide polyphosphazenes having curative sites which contain unsaturation and which can be cured by means of sulfur cures or radiation cures.

A more specific object is to provide a cure for polyphosphazenes which is compatible with aqueous latex formulations, such as may be useful in latex foam technology, unlike the previously available peroxy cures for such phosphazenes.

Another object of the invention is to provide novel phosphazene terpolymers and to provide procedures and formulations whereby the raw gums comprising said polyphosphazenes are incorporated into compositions from which useful articles with outstanding properties are obtained.

A further object of the invention is to provide compositions and articles which exhibit excellent low temperature flexibility and good physical strength over an extremely broad range of service conditions.

These and other objects of the invention are achieved by providing sulfur based or radiation cures for phosphazene polymers containing small but significant amounts of unsaturation in some of the substitutents attached to the P atoms of the —P=N— chain, in addition to saturated substituents including alkoxy, cycloalkoxy, aryloxy, arylalkoxy, alkyl substituted aryloxy, and otherwise substituted aryloxy and/or alkoxy groups attached to the P atoms, a particularly preferred unsaturated substituent being an o-allyl phenoxy group. In the preferred embodiment of the invention, 0.1-5% by weight of groups containing some unsaturation are randomly distributed among the saturated groups attached to the —P=N— polymer backbone.

Briefly, the invention contemplates sulfur accelerated cures of phosphazene polymers in which most of the chlorine atoms in linear $(NPCl_2)_n$ polymer have been replaced with substituents such as those described in the prior art noted above, e.g., alkoxy, and/or aryloxy groups which may be substituted in the manner taught in the United States Patents noted above, and the replacement of the remaining chlorine atoms in linear $(NPCl_2)_n$ polymer with substituents which possess at least some unsaturation which will serve as a cure site.

The following structural formula may be taken as one way of illustrating the polyphosphazenes of the present invention, although it is to be understood that the distribution of the Q, Q' and Q" groups may be regular or irregular and that the phosphazene polymer may be either linear or branched:

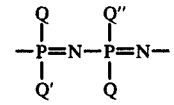

in which Q, Q' and Q" represent monovalent groups randomly distributed along the —P=N— backbone. The Q and Q' groups are preferably substituted or unsubstituted alkoxy or aryloxy groups which are relatively inert or unreactive to sulfur curing accelerators as compared to the Q" groups which contain some unsaturation, the total of Q and Q' groups being sufficient to replace at least 90% and preferably at least 95% but not more than 99.9% of the Cl atoms originally present in the linear $(NPCl_2)_n$ polymer. The Q" groups are groups with some unsaturation, e.g., a group represented by O—R—R' in which R is alkylene or arylene and R' is a group which includes some olefinic unsaturation, e.g., alkenyl groups such as vinyl, allyl, crotyl, or the like, the number of Q" groups distributed randomly in the phosphazene being preferably between 0.1 and 5% of the total of Q plus Q' plus Q". The Q and Q' groups may be either the same or they may differ and each may represent more than one saturated group. Fluorine is absent from both Q and Q', thereby reducing the cost of the polyphosphaznes of this invention as compared with prior art fluoroalkoxy or fluoraryloxy polyphosphazenes. Because of the greater reactivity exhibited by the Q" groups, as compared with the Q and Q' groups, the Q" groups serve as cure sites for cross linking and vulcanization, as will be seen in the data which follows.

EXAMPLE

(a) Preparation Of Sodium Aryloxides

The amounts of reactants (based on 200 g of $(NPCl_2)_n$ chloropolymer) are calculated as follows, 200 g of chloropolymer being considered equivalent to 200/116, i.e., 1.72 moles $(NPCl_2)_n$:

| | |
|---|---|
| Theory for aryloxides | 2 moles/mol of $(NPCl_2)_n$ = 3.44 moles (2 × 1.72) |
| Actual amount of aryloxides provided | 3.82 mole (11% excess) |
| Amount of sodium provided | 3.83 mole (88 g) |
| The following amounts of phenols were provided: | |
| phenol | 194 g (60%) |
| p-ethylphenol | 207.4 g (50%) |
| o-allylphenol | 56 g (12%) |

The phenols and sodium are weighed separately into bottles in which they are mixed with anhydrous tetrahydrofuran (THF) and capped. These operations are carried out in a Dry-Box. About 1200 ml of THF was added to the phenols and about 150 ml of THF was added to the sodium.

The Na/THF is added to three-necked flask equipped with a stirrer, dropping funnel and an argon or nitrogen purge line. Under the purge atmosphere, the phenols in THF were added dropwise with stirring over about 2 hours at room temperature, the reaction being exothermic. After addition of the phenols, the reaction mixture was stirred at room temperature overnight. Generally, after 8 hours stirring the sodium has all reacted. A yellow to brown solution of the phenolates is obtained.

(b) Derivatization of (NPCl$_2$)$_n$

The 200 g of linear (NPCl$_2$)$_n$ in benzene (total volume is about 2400 ml) is added rapidly (20 to 30 minutes) to the aryloxides in 1200 ml of THF and 2500 ml of benzene in the reactor. The reaction mixture is then stirred at about 300° F. for 24 hours. Upon cooling, the polymer is coagulated by pouring into a 10 gallon can containing 2 gallons of methanol with agitation. The solvents are then drawn off. Additional methanol may be added if the polymer does not separate cleanly from the solution. The solid, as free as possible of solvent, is then desalted by washing with water. The resulting chlorine-free polymer is dried at 50° to 60° under vacuum, and was found to have a dilute solution viscosity (DSV) of 2.13. It analyzed 0.011% Na, 0.017% Cl and exhibited a Tg of −15.5° C.

The preparative procedure was repeated using the alcohols and phenols set forth in the following table.

Some of the polyphosphazenes were compounded with the constituents shown in the tables which follow and press cured. The properties of the product are shown in Tables I and II.

EXAMPLES

| Ex. | Na | Alcohol/Phenol | Reactants (Grams) | OAP | Reaction Temp ° F | Water-Washed Product DSV | T$_g$° C |
|---|---|---|---|---|---|---|---|
| 1. | 44 | m-cresol | 55.8 | 7 | 300 | 0.97 | −14 |
|  |  | p-cresol | 55.8 |  |  |  |  |
|  |  | phenol | 97 |  |  |  |  |
| 2. | 44 | m-cresol | 111.6 | 7 | 300 | 1.45 | −19 |
|  |  | phenol | 96.5 |  |  |  |  |
| 3. | 44 | methanol | 325 | 7 | 158/176 | 1.21 | −77 |
| 4. | 44 | phenol in THF | 301 | 7 | 300 | 1.19 | −65 |
|  |  | amyl alcohol | 294 |  |  |  |  |
| 5. | 44 | ethanol | 327 | 14 | 158/176 | 2.43 | −88 |
| 6. | 44 | m-cresol | 55.8 | 7 | 300 | 1.34 | −14 |
|  |  | p-cresol | 55.8 |  |  |  |  |
|  |  | phenol | 97 |  |  |  |  |
| 7. | 88 | methanol | 459 | 28 | 140/150 | 0.62 | −76 |
| 8. | 44 | phenol | 120 | 7 | 158 | 1.45 | −34 |
|  |  | ethanol | 170 |  |  |  |  |
| 9. | 44 | phenol | 97 | 7 | 293/300 | 0.75 | −24 |
|  |  | m-cresol | 100 |  |  |  |  |
|  |  | amyl alcohol | 20 |  |  |  |  |
| 10. | 44 | m-cresol | 50 | 7 | 300/306 | 1.00 | −15 |
|  |  | p-cresol | 50 |  |  |  |  |
|  |  | amyl alcohol | 20 |  |  |  |  |
|  |  | phenol | 97 |  |  |  |  |
| 11. | 44 | p-ethyl phenol | 133 | 7 | 267/310 | 0.37 | −11 |
|  |  | phenol | 97 |  |  |  |  |
| 12. | 88 | phenol | 240.8 | 30 | 276/303 | 1.83 | −60 |
|  |  | amyl alcohol | 545 |  |  |  | −36 |
| 13. | 44 | amyl alcohol | 574 | 7 | 158/176 | 2.76 | −107 |
| 14. | 132 | p-ethyl phenol | 397 | 21 | 270/315 | 1.88 | −20 |
|  |  | phenol | 291 |  |  |  |  |
| 15. | 132 | phenol | 360 | 21 | 295/305 | 1.62 | −68.5 |
|  |  | amyl alcohol | 823 |  |  |  |  |
| 16. | 176 | phenol | 388 | 112 | 294/300 | 1.38 | −20 |
|  |  | p-ethyl phenol | 414.8 |  |  |  |  |
| 17. | 55 | methanol | 483 | 30 | Reflux | 1.53 | −77 |
| 18. | 43.6 | phenol | 350 | 2.4 | Reflux | 1.89 | −78 |
|  |  | amyl alcohol | 81 |  |  |  |  |
| 19. | 65.5 | phenol | 121.5 | 3.6 | Reflux | 3.10 | −76 |
|  |  | amyl alcohol | 392.5 |  |  |  |  |
| 20. | 176 | p-ethyl phenol | 414 | 112 | 300 | — | −18 |
|  |  | phenol | 388 |  |  |  |  |
| 21. | 44 | p-ethyl phenol | 83 | 28 | 300 | 1.52 | −17 |
|  |  | phenol | 113 |  |  |  |  |

The several polyphosphazenes described in Examples 1–21 above, have been cured by sulfur accelerated cures, in much the same manner as rubber is vulcanized, e.g., as described in Morton's "Rubber Technology" Second Edition, published 1973 by van Nostrand-Reinhold Co. (New York) on pages 27 and 28.

Satisfactory cures are obtained with between about 0.25 and 5.0 parts of sulfur per 100 parts of polyphosphazene. Results are shown in Tables I and II which follow.

TABLE I

Accelerated Sulfur Cure of Polyphosphazene of Examples 17, 18, 19

| Compound | 17 | 18 | 18 | 18 | 18 | 18 | 19 | 19 |
|---|---|---|---|---|---|---|---|---|
| Polymer | 100 | 100 | 100 | 100 |  | 100 | 100 | 100 |
| Carbon Black | 40 | 50 | 50 | 50 | 50 |  | — | 30 |
| Zinc Oxide | 5 | 5 | 5 | 5 | 5 |  | 5 | 5 |
| Sulfur | 0.5 | 1.5 | 0.35 | 0.35 | 0.35 |  | 0.5 | 0.5 |
| Dithiodimorpholine | 1 | — | — | 1 | 1 |  | 1 | 1 |
| Butyl Zimate | 2 | — | — | — | — |  | 2 | 2 |
| Methyl Zimate | 2 | — | — | — | — |  | 2 | 2 |
| Aromatic Oil | 20 | — | — | — | 20 |  | — | — |
| Bis(8-oxyguinolate)zinc (II) | 2 | — | — | — | — |  | — | — |
| Stearic Acid | — | 1 | 1 | 1 | 1 |  | — | — |
| Mercapto Benzothiazole | — | 1 | 1 | — | — |  | — | — |
| Zinc Dimethyldithiocarbamate | — | 1.5 | 4 | 4 | 4 |  | — | — |

TABLE I-continued,54

Accelerated Sulfur Cure of Polyphosphazene of Examples 17, 18, 19

| Compound | 17 | 18 | 18 | 18 | 18 | 18 | 19 | 19 |
|---|---|---|---|---|---|---|---|---|
| Silanox 101 | — | — | — | — | — | — | 30 | — |
| Stress/Strain | | | | | | | | |
| Press Cure (min./° F) | 30/300 | 30/300 | 15/320 | 30/300 | 15/32 | Aged 24 hr/1300 | 10/300 | 20/300 |
| 100% modulus (psi) | 145 | — | — | — | 325 | 500 | — | — |
| 200% modulus (psi) | 222 | — | — | — | — | — | 175 | 590 |
| Tensile strength | 1336 | 1150 | 1100 | 1500 | 975 | 575 | 1450 | 1125 |
| Elong. (at Break %) | 815 | 50 | 50 | 70 | 210 | 245 | 450 | 310 |
| % Tension Set (at Break) | 18 | | | | | | | |
| | 17 | | | | | | | |
| Shore A Hardness | 65 | | | | | | | |
| Steel Ball Rebound (%) | | | | | | | | |
| 73° F | 38 | | | | | | | |
| 212° F | 33 | | | | | | | |
| Rating (Wet) Glass Plate | | | | | | | | |
| 73° F | 98 | | | | | | | |
| YMI° C | −53 | | | | | | | |
| NBS Abrasive Index | 69 | | | | | | | |

Each of the several formulations of Examples 14, 16 (with and without any OAP) and 20 was molded into slabs cured at 320° F. for 30 minutes and the physicals determined for ring tensile and dumbbell tensile specimens made from the slabs. Then the rheological properties were measured in a Monsanto Rheometer at 300° F., 1° arc, 100 RPM (ASTM Test No. D 2084-75).

The results are shown in the following table.

TABLE II

| Compound | 14 | 16 | 20 | |
|---|---|---|---|---|
| Polymer | 100 | 100 | 100 | |
| Carbon Black | 25 | 25 | 25 | |
| Zinc Oxide | 5 | 5 | 5 | |
| Sulfur | 1.5 | 1.5 | 1.5 | |
| Stearic Acid | 1 | 1 | 1 | |
| Methyl Zimate | 1.5 | 1.5 | 1.5 | |
| Santocure NS | 1 | 1 | 1 | |
| Ring Tensile Properties - Cure 30' at 320° F | | | | |
| 10% Modulus | 30 | 16 | 52, | 28 |
| 50% Modulus | 115 | 515 | 378, | 344 |
| 100% Modulus | 333 | — | | |
| 200% Modulus | 950 | | | |
| Tensile Strength | 1327 | 1284 | 1268, | 956 |
| Elongation (at Break %) | 270 | 80 | 90, | 80 |
| Dumbbell Tensile Properties - Cure 30' at 320° F | | | | |
| 10% Modulus | | | 44, | 120 |
| 50% Modulus | | | 378, | 812 |
| 100% Modulus | 355 | | | |
| 200% Modulus | 975 | | | |
| Tensile Strength | 1155 | 1160 | 972, | 1076 |
| Elongation (at Break %) | 230 | 80 | 80, | 70 |
| Monsanto Rheometer Cure Data - Temp. 300° F, 1° Arc, 100 RPM | | | | |
| Scorch Time, Min. to Scorch TS (2) | 2.6 | 1.5 | 2.3 | |
| Optimum Cure, Min. to TC (90) | 8.9 | 7.5 | 12.6 | |
| Minimum Torque. dNm at 1 P (L) | 3.1 | 3.8 | 3.0 | |
| Torque at 90% Cure, dNm at 1 P (90) | 12.7 | 30.2 | 27.6 | |
| Maximum Torque, dNm at 1 P (100) | 13.8 | 33.1 | 30.3 | |
| Cure Rate Index | 15.9 | 16.7 | 9.7 | |

The polyphosphazenes of Examples 1–21 and others of a similar nature containing some unsaturation in the groups attached to the P atoms may also be cured without the use of sulfur, by means of high energy electrons, dosages of 1 to 15 megarads depending on the thickness of the polymer stock, are suitable. The formulations cured by radiation are similar to those shown in Tables I and II except that the sulfur and accelerator additives are omitted and only the fillers such as silica and carbon black are required, since the desired cross links are produced by the high energy electrons in the radiation to which the polymer is exposed.

I claim:

1. Sulfur cured non-fluorinated linear polyphosphazenes represented by the general formula

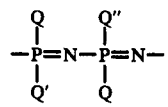

in which Q, Q' and Q" represent monovalent groups randomly distributed along the —P=N— backbone, each of Q and Q' being free from flourine and being selected from the group consisting of alkoxy and aryloxy, both substituted and unsubstituted, and Q" being a group with olefin unsaturation, the amount of Q" being between 0.1 and 5% of the total of Q, Q' and Q".

2. The sulfur cured polyphosphazenes of claim 1 wherein Q" is a group represented by O—R—R' in which R is alkylene or arylene and R' is a group which contains some olefinic unsaturation.

3. The sulfur cured polyphosphazenes of claim 1 wherein Q" is orthoallylphenoxy.

4. Sulfur cured polyphosphazenes produced by the process of claim 1.

5. A process of curing polyphosphazenes represented by the general formula

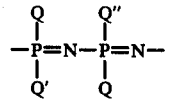

wherein Q, Q', and Q" are as defined in claim 1 which comprises compounding said polymer with between 0.25 and 5.0 parts of sulfur for each 100 parts of polymer and curing the resulting composition.

6. A process of curing non-fluorinated linear polyphosphazenes represented by the general formula

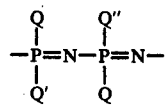

in which Q, Q' and Q" represent monovalent groups randomly distributed along the —P=N— backbone, each of Q and Q' being free from fluorine and being selected from the group consisting of alkoxy and aryloxy, both substituted and unsubstituted, and Q" being a group with olefinic unsaturation, the amount of Q" being between 0.1 and 5% of the total of Q, Q' and Q", which comprises exposing said polymer to a dose of high energy radiation.

7. The process of claim 6 wherein the dose of radiation is between 1 and 15 megarads of high energy electrons.

8. The radiation cured polyphosphazene produced by the process of claim 6.

9. The polyphosphazenes of claim 1 wherein at least one of Q and Q' is a phenoxy group.

10. The polyphosphazenes of claim 9 wherein Q is a phenoxy group and Q' is an alkoxy group selected from methoxy, ethoxy and amyloxy.

11. The polyphosphazenes of claim 9 wherein Q is p-ethyl phenoxy.

12. The polyphosphazenes of claim 9 wherein Q is m-cresoxy or p-cresoxy.

13. The polyphosphazenes of claim 1 wherein Q and Q' are alkoxy selected from the group consisting of methoxy, ethoxy and amyloxy.

* * * * *

UNITED STATES PATENT OFFICE
CERTIFICATE OF CORRECTION

Patent No. 4,116,785          Dated September 26, 1978

Inventor(s) Tai Chun Cheng

It is certified that error appears in the above-identified patent and that said Letters Patent are hereby corrected as shown below:

TABLE I, in the last column headed "18" for the Compound

"100" should be deleted and inserted therefor in the next-to-the-last-column headed "18"

thus it should be:

"compound    17    18    18    18    18    18
             100   100   100   100   100          "

IN THE CLAIMS

Claim 4, line 2

"claim 1" should be -- claim 5 --

Signed and Sealed this

Nineteenth Day of February 1980

[SEAL]

Attest:

SIDNEY A. DIAMOND

Attesting Officer    Commissioner of Patents and Trademarks